(No Model.) 2 Sheets—Sheet 2.
G. TISCHER.
SKID.
No. 255,126. Patented Mar. 21, 1882.
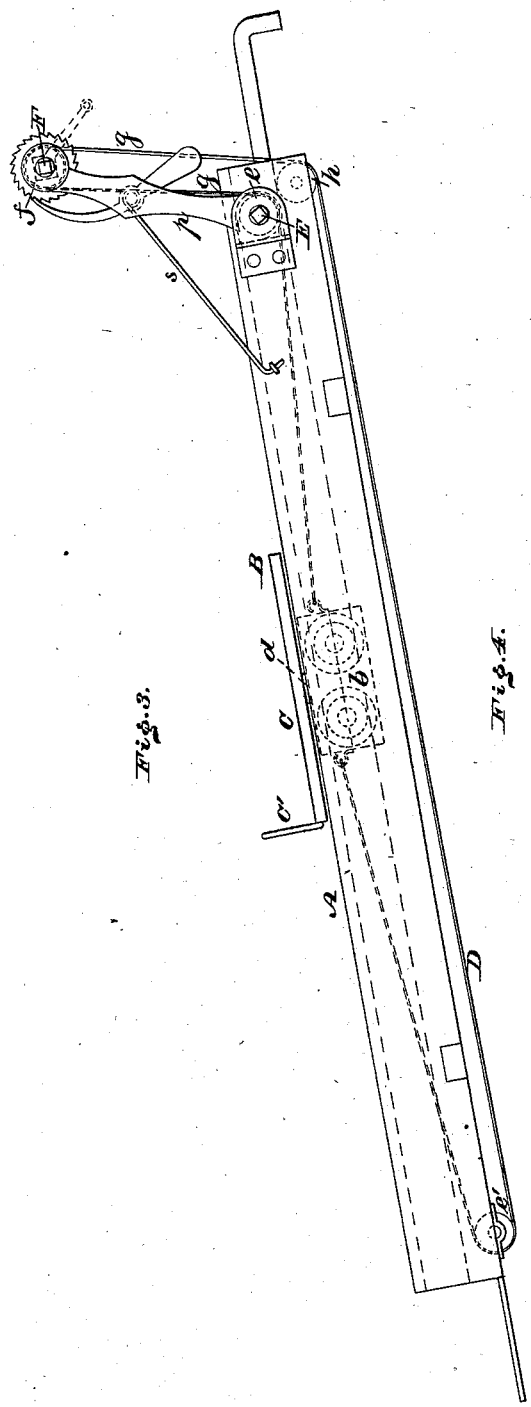
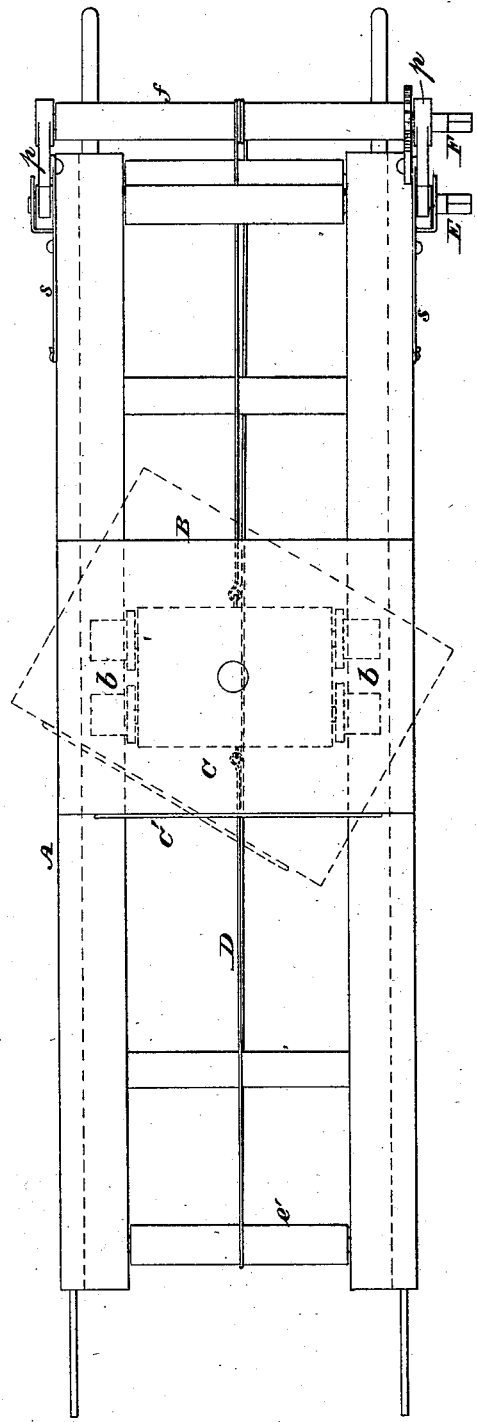
WITNESSES:
L. Douville
W. F. Kircher
INVENTOR:
Gustav Tischer,
BY John A. Diedersheim,
ATTORNEY.

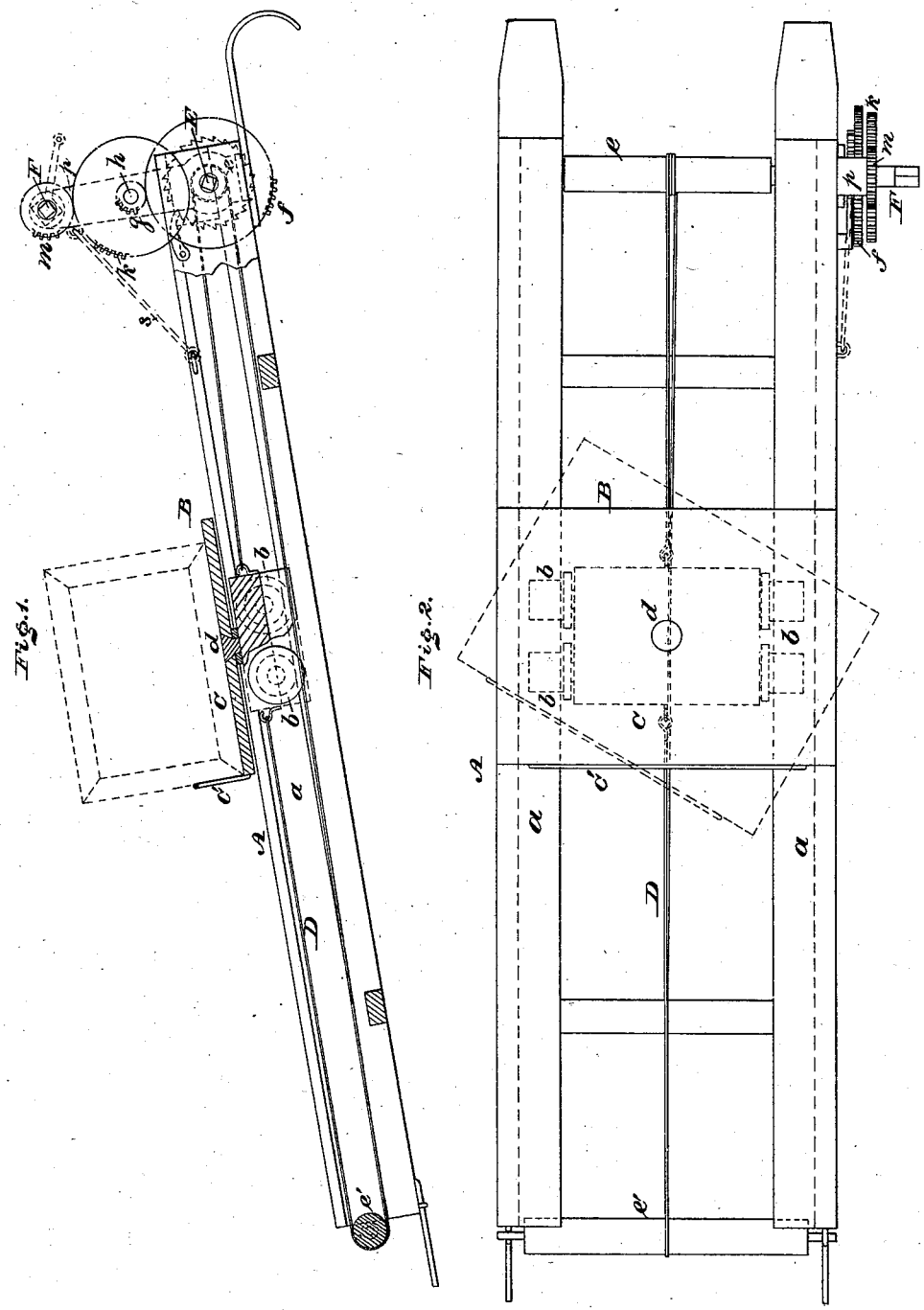

UNITED STATES PATENT OFFICE.

GUSTAV TISCHER, OF WILMINGTON, DELAWARE.

SKID.

SPECIFICATION forming part of Letters Patent No. 255,126, dated March 21, 1882.

Application filed January 14, 1882. (No model.)

*To all whom it may concern:*

Be it known that I, GUSTAV TISCHER, a subject of Germany, residing at Wilmington, in the county of New Castle, State of Delaware, have invented a new and useful Improvement in Skids, which improvement is fully set forth in the following specification and accompanying drawings, in which—

Figure 1 is a side elevation, partly sectional, of the skid embodying my invention. Fig. 2 is a top or plan view thereof. Fig. 3 is a side elevation of a modification. Fig. 4 is a top or plan view thereof.

Similar letters of reference indicate corresponding parts in the several figures.

My invention consists of the truck of the skid provided with a rotatable platform, whereby the load may be readily set on and removed from said platform.

It also consists of gearing for raising the truck, provided with two shafts, to each of which a crank-handle may be attached, whereby the gearing may be operated by either crank-handle or by both crank-handles, as required or desired.

Referring to the drawings, A represents the frame of the skid, formed of side pieces, $a$ $a$, and suitable cross-bars or connecting-pieces, said side pieces forming tracks for the wheels or rollers $b$ of the truck B, the tracks being metal-bound, if desired.

C represents a platform, which is connected to the truck B by a vertical pivot, $d$, whereby it may be rotated; and C' represents an upright guard at one end of the platform, for preventing the load on the platform from slipping therefrom during the motions of the truck.

To the truck are connected the ends of a chain, cord, or conveyer, D, which is passed around rollers $e$ $e'$, mounted at opposite ends of the frame A. The roller $e$ is secured to and sustained by a shaft, E, whose bearings are on the frame A, and the end of said shaft is squared, in order to have fitted to it a crank-handle for operating purposes, said shaft also carrying a spur-wheel, $f$, with which meshes a pinion, $g$, on a stud, $h$, the latter carrying a spur-wheel, $k$, with which meshes a pinion, $m$, whose shaft F is squared in order to have fitted to it a crank-handle for operating purposes, the stud $h$ and shaft F being mounted on an upright, $p$, rising from and secured to the frame.

The skid may be placed on a wagon or other vehicle to be loaded or unloaded, or in a cellar or door way or other locality from and to which a load is to be transferred.

When a load is to be elevated it is rested on the truck against the guard C', as in Fig. 1; but in the case of a box, or other large or heavy article, the platform may be rotated so that the guard C' is at the side or top, whereby the load may be readily placed on the platform, after which the platform is again rotated so that the guard is at the lower end. A crank-handle is applied to either of the shafts E F and rotated, the effect of which is to set the conveyer D in motion, and thus raise the truck with its load.

It will be seen that if the load is being taken from the pavement to a wagon, from the cellar to the pavement, or from one story of a building to another, the workman standing on the highest point may readily operate the upper shaft, F, or if he is on a lower place he may operate the shaft E, or if the load is heavy a crank-handle may be fitted to each shaft E F, so that two persons may operate the device at different places without interfering with each other.

When a load is to be lowered the descent of the truck may be by the crank-handle or handles, and when the truck reaches its lowest point the platform C may be swung around so as to change the position of the guard C', and thus permit the dumping of the load in a rapid and convenient manner.

In Fig. 3 the uprights $p$ support a roller, $f$, at top, the conveyer D being extended so as to pass around said roller, as at $g$, and another roller, $h$, mounted on the frame A, adjacent to the roller $e$; but either shaft E F or both shafts may be operated, as in the previous case, power, however, being communicated directly to the conveyer D, instead of by intermediate gearing.

The uprights $p$ are hinged to the frame A and held in position by movable braces or hooks $s$, whereby, when the latter are released, the uprights may be folded on the frame, placed horizontally or otherwise set, and thus permit the skid to be transported or stowed in a convenient manner.

Having thus described my invention, what I claim as new, and desire to secure by Letters Patent, is—

1. The skid having a truck provided with a rotatable platform, substantially as and for the purpose set forth.

2. The frame, truck, and conveyer, in combination with the two squared shafts E F and the gearing, substantially as and for the purpose set forth.

3. The frame, truck, conveyer, and rollers, in combination with the pivoted uprights $p$, substantially as and for the purpose set forth.

GUSTAV TISCHER.

Witnesses:
JOHN A. WIEDERSHEIM,
W. F. KIRCHER.